M. PIFER.
COOKING-STEAMER.

No. 169,373. Patented Nov. 2, 1875.

(Vertical sec. in center.)

Figure 1:
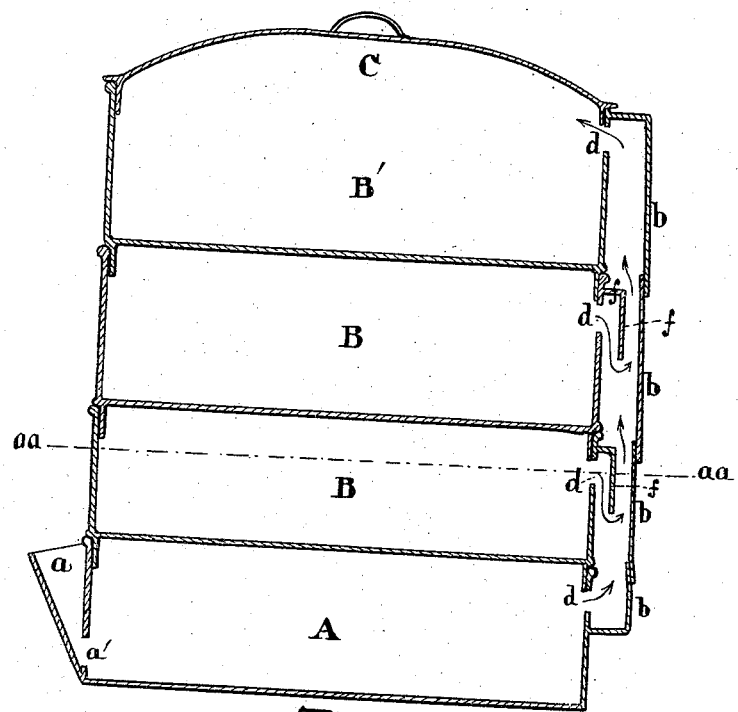

(Sec. on line "aa" fig. 1.)

UNITED STATES PATENT OFFICE.

MICHAEL PIFER, OF EUREKA, ILLINOIS.

IMPROVEMENT IN COOKING-STEAMERS.

Specification forming part of Letters Patent No. 169,373, dated November 2, 1875; application filed October 4, 1875.

*To all whom it may concern:*

Be it known that I, MICHAEL PIFER, of Eureka, in the county of Woodford, in the State of Illinois, have invented an Improvement in Cooking-Steamers; and do hereby declare that the following is a full, clear, and exact description thereof, reference being had to the annexed drawings, making a part of this specification, in which like letters of reference refer to like parts, and in which—

Figure 2:
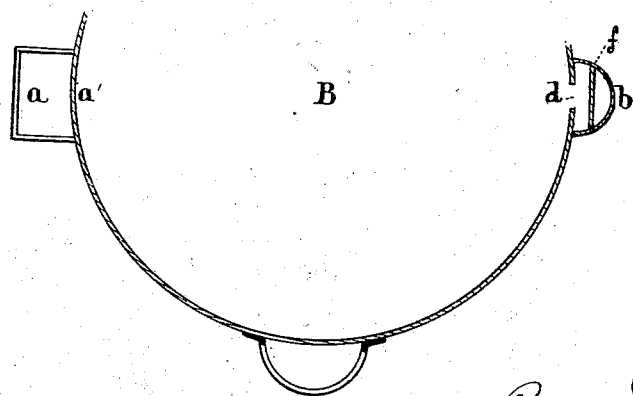

Figure 1 represents a vertical section on line $b\ b$, Fig. 2; Fig. 2, a horizontal section on dotted line $a\ a$, Fig. 1.

This invention is an improvement in the mode of constructing a nest of steamers, (which receive steam from a boiler below,) to prevent the communication of flavors from one steamer to another. I make the communication between the steamers by means of outside pipes, a section of pipe to each steamer, which, like the latter, fit one into another.

Hitherto these intercommunicating steam-pipes have been placed within the steamers, where they are much in the way, and also act to mix and spoil the flavors of the food in the respective steamers.

In my steamer the steam from each vessel passes out through an opening into a passage which opens downward only into the general steam-pipe, and thence flows upward after a short descent, so as to prevent the refluence of steam and odors into the steamer from which said passage opens.

In the drawings, A represents the boiler, provided with the usual blow-off $a$, through which, on the water in the boiler becoming low, the steam passes out through the hole $a'$, which otherwise is always under water. In the side near the top is a passage, $d$, into the pipe $b$, which here joins and fits into an upward continuation of the same on the steamer above it. B B, &c., represent separate nests of steamers, all of the same common construction, excepting the closing of the pipe at the upper end in the topmost steamer, fitting one into the other, and having tight bottoms and sides, excepting where an aperture, $d$, leads into the common pipe $b$. This pipe $b$ fits over the one on the steamer immediately below it, and enters that one immediately above it. The aperture $d$ in each steamer opens into a roofed chamber, having a downward opening only, formed by a diaphragm, $f$, over said opening, and extended downward along the pipe $b$ for a short distance, so as to conduct the steam and odors downward, and by thus producing a downward current at the mouth of said chamber prevent a refluence of other odors through this opening; C, the cover.

The operation has been sufficiently described at different points in the above specification; but I will here give a general view of the same. The steam rising in the pipe $b$ receives tributary jets from the lower edges of the respective diaphragms $f\ f$, which latter deflects rising steam and odors from the inclosed chamber, and their respective entrances to each steamer.

The placing of the pipes on the exterior of the steamers avoids the collection of dirt in the angles formed by the pipe when attached to the inside of the steamers, and also the mixing of flavors from the articles in the respective steamers.

What I claim as my invention is—

1. In a cooking-steamer, the diaphragm $f$, in combination with the pipe $b$, the opening $d$, and steamer B, substantially as and for the purposes described.

2. In a cooking-steamer, the combination with the respective steamers B and passages $d$, of the outside pipe $b$, provided with the diaphragm $f$ over the passage $d$, constructed, arranged, and operating substantially as and for the purposes described.

3. The combination of the boiler A, steamers B, and upper steamer B', sectional outside pipe, and diaphragms $f\ f$, arranged as described.

In testimony that I claim the foregoing cooking-steamers I have hereunto set my hand this 27th day of September, 1875.

MICHAEL PIFER.

Witnesses:
 HENRY W. WELLS,
 JOHN TOWNSEND.